US009937796B2

(12) United States Patent
Okada

(10) Patent No.: US 9,937,796 B2
(45) Date of Patent: Apr. 10, 2018

(54) USER INTERFACE DEVICE WITH LIGHT-EMITTER INPUT SWITCH

(71) Applicant: DENSO CORPORATION, Kariya, Aichi-pref. (JP)

(72) Inventor: Noriaki Okada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 157 days.

(21) Appl. No.: 14/647,420

(22) PCT Filed: Nov. 5, 2013

(86) PCT No.: PCT/JP2013/006511
§ 371 (c)(1),
(2) Date: May 26, 2015

(87) PCT Pub. No.: WO2014/083773
PCT Pub. Date: Jun. 5, 2014

(65) Prior Publication Data
US 2015/0298550 A1    Oct. 22, 2015

(30) Foreign Application Priority Data

Nov. 27, 2012   (JP) .................................. 2012-258839

(51) Int. Cl.
*G06F 3/041* (2006.01)
*B60K 37/06* (2006.01)
(Continued)

(52) U.S. Cl.
CPC .............. *B60K 37/06* (2013.01); *G05B 15/02* (2013.01); *G06F 3/041* (2013.01); *H04W 4/008* (2013.01);
(Continued)

(58) Field of Classification Search
CPC . G06F 3/041; B60K 37/06; B60K 2350/2039; B60K 2350/1024; B60K 2350/1028
(Continued)

(56) References Cited

U.S. PATENT DOCUMENTS 4,593,357 A * 6/1986 Van Ostrand ............ G07C 5/10
340/439
5,173,856 A * 12/1992 Purnell .................... G07C 5/10
307/10.1
(Continued)

FOREIGN PATENT DOCUMENTS

JP    2001156728 A    6/2001
JP    2005191819 A    7/2005

OTHER PUBLICATIONS

International Search Report and Written Opinion (in Japanese with English Translation) for PCT/JP2013/006511, dated Jan. 28, 2014; ISA/JP.

*Primary Examiner* — Yuzhen Shen
(74) *Attorney, Agent, or Firm* — Harness, Dickey & Pierce, P.L.C.

(57) ABSTRACT

A user interface device is provided that includes a hardware interface connectable to different types of external devices and an internal control device configured to perform a single control process to implement one of functions that corresponds to at least one of a type of an external device connected to the hardware interface or whether an external device is connected to the hardware interface. The internal control device executes, from among tasks constituting the single control process, a task that corresponds to timing of inputting a press manipulation using an input switch, blinks the light-emitter at a predetermined speed while the task is in execution, and steadily lights the light-emitter when terminating the task and prompting the user to input a next press manipulation.

11 Claims, 6 Drawing Sheets

(51) Int. Cl.
    *G05B 15/02*     (2006.01)
    *H04W 4/00*     (2018.01)

(52) U.S. Cl.
    CPC ............... *B60K 2350/1024* (2013.01); *B60K 2350/1028* (2013.01); *B60K 2350/2039* (2013.01); *B60K 2350/357* (2013.01)

(58) Field of Classification Search
    USPC .............................................. 345/173; 701/1
    See application file for complete search history.

(56) References Cited

U.S. PATENT DOCUMENTS

| | | | | |
|---|---|---|---|---|
| 6,611,697 | B1* | 8/2003 | Ewing | H04M 1/22 |
| | | | | 320/114 |
| 2007/0188643 | A1 | 8/2007 | Maniwa et al. | |
| 2008/0294302 | A1* | 11/2008 | Basir | G01C 21/20 |
| | | | | 701/2 |
| 2013/0080216 | A1* | 3/2013 | Gravelle | H04Q 9/00 |
| | | | | 705/13 |
| 2014/0343782 | A1* | 11/2014 | Nelson | G05D 1/0212 |
| | | | | 701/25 |

* cited by examiner

USER INTERFACE DEVICE WITH LIGHT-EMITTER INPUT SWITCH

CROSS REFERENCE TO RELATED APPLICATIONS

This application is a U.S. National Phase Application under 35 U.S.C. 371 of International Application No. PCT/JP2013/006511 filed on Nov. 5, 2013 and published in Japanese as WO 2014/083773 A1 on Jun. 5, 2014. This application is based on and claims the benefit of priority from Japanese Patent Application No. 2012-258839 filed on Nov. 27, 2012. The entire disclosures of all of the above applications are incorporated herein by reference.

TECHNICAL FIELD

The present disclosure relates to a user interface device that exchanges information between a user and an internal control device.

BACKGROUND ART

According to the prior art, there is known a vehicular cooperation platform that performs wireless communication between a mobile terminal of a user and an internal control device on a vehicle, allows the internal control device to transmit vehicle information such as a vehicle speed and a battery state, and allows the mobile terminal to display the vehicle information received from the internal control devices on a display device (e.g., see patent literature 1).

Generally, this type of vehicular cooperation platform includes a touch panel provided for the display device placed in the vehicle or provided for the display device of the mobile terminal. The vehicular cooperation platform accepts a user-requested function based on the display on the touch panel and allows the internal control device to perform a control process that implements the function.

Because the control process corresponding to one function includes several tasks, a generally employed configuration is such that a user-requested item is accepted based on the display on the touch panel and the internal control device performs a task corresponding to the item.

PRIOR ART LITERATURES

Patent Literature

Patent Literature 1: JP-2005-191819A

SUMMARY OF INVENTION

According to one proposed form of the vehicular cooperation platform, USB memory is connected to a vehicle, for example. The internal control device stores more detailed travel data as well as a vehicle speed in the USB memory. For example, the user's travel data (stored in the USB memory) may be used for a racing game running on a home video game machine to virtually reproduce the user's travel in the game For example, many items or functions may be displayed on the touch panel so that the user can perform input manipulation to select a user-requested function or item. However, such input manipulation may increase the user's burden if a relatively small number of functions or items are available such as simply transmitting vehicle information to a mobile terminal or storing travel data in the USB memory as described above.

Specifically, the display device may display an image representing progress of the user-selected task (e.g., saving the travel data) or an image prompting the user to change to the next task. In such case, the user is forced to input information about the displayed image. This slightly extends the time until the input. In particular, there is a concern that while driving a vehicle, the user may divert his or her attention from the driving for a long time to affect the safe driving.

The present disclosure has been made in consideration of the foregoing and relates to a user interface device constituting a cooperation platform together with an external device. It is an object of the present disclosure to provide a user interface device that, with a simply configured system, is capable of easily accepting a function (and an item) requested by a user and intuitively transmitting a request from an internal control device to the user.

A user interface device according to an example of the present disclosure comprises: an light-emitter-attached input switch that includes an input switch for a user to input press manipulation and a light-emitter attached to the input switch; a hardware interface that is connectable to different types of external devices; and an internal control device that performs a single control process to implement one of predetermined functions that corresponds to at least one of: a type of an external device connected to the hardware interface; or whether an external device is connected to the hardware interface. The internal control device: executes, from among a plurality of tasks constituting the single control process, a task that corresponds to timing of inputting the press manipulation using the light-emitter-attached input switch; blinks the light-emitter at a predetermined speed while the task is in execution; and steadily lights the light-emitter when terminating the task and prompting the user to input a next press manipulation.

According to this user interface device, the user just needs to select an external device connected to the user interface device or the necessity of connecting the external device. The user interface device automatically performs a control process corresponding to the function associated with the selection. This can eliminate the need for the user to select functions using a touch panel. The user just needs to press the input switch with the on-state light-emitter, in order to change a task (item) executed in the control process (function) to the next task (item). This can also eliminate the need for the user to specify items using a touch panel. Further, allowing the user to simply input the state of the switch is considered to shorten the time needed for the input manipulation rather than using the information on a displayed image. The user just needs to press the switch when the switch turns on. The user just needs to wait while the switch blinks. The user can easily identify a request from the internal control device according to the state of the switch. Therefore, with a simple configuration, the user interface constituting the cooperation platform together with the external device can easily accept a function (and an item) requested by the user and intuitively transmit a request from the internal control device to the user.

BRIEF DESCRIPTION OF DRAWINGS

The foregoing and other objects, features and advantages concerning the present disclosure will become more apparent from the detailed description given below with reference to the accompanying drawings in which.

EMBODIMENTS FOR CARRYING OUT INVENTION

With reference to accompanying drawings, the following describes a vehicular cooperation platform (hereinafter abbreviated as a "vehicular cooperation PF") as an embodiment of the user interface device mounted on a vehicle.

(Overall Configuration)

Figure 1:
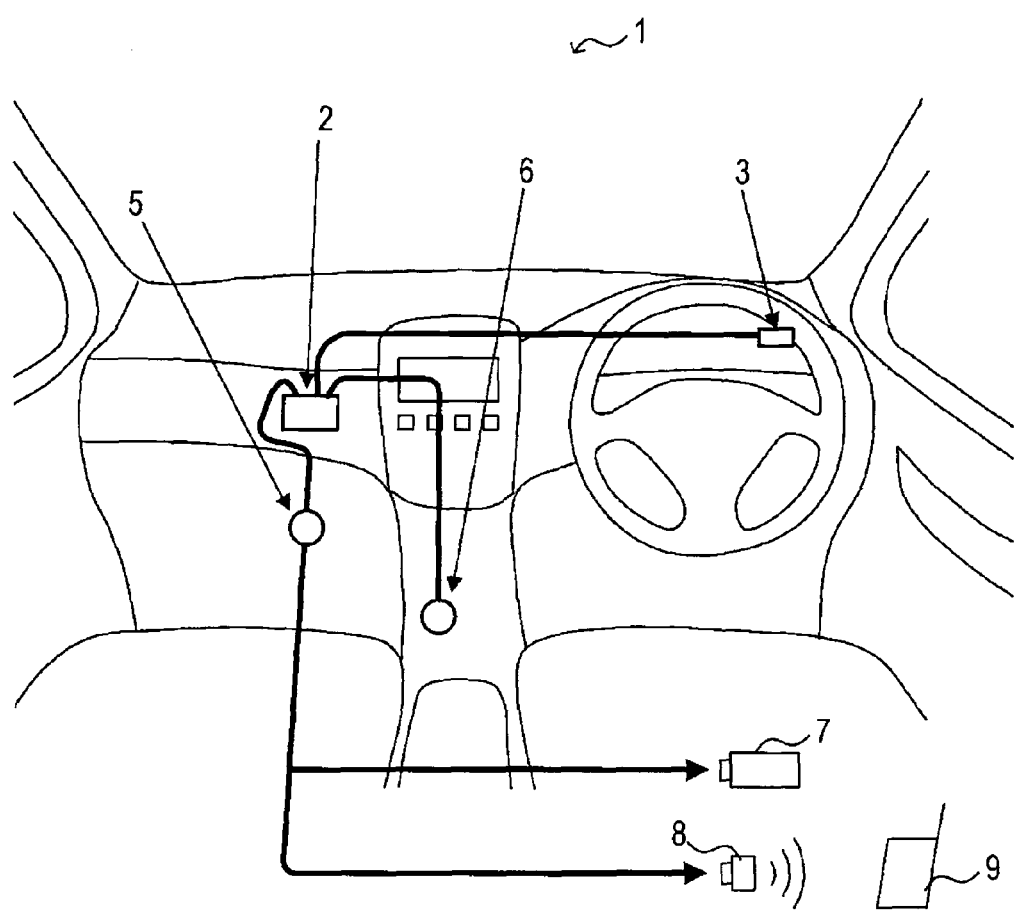
FIG. 1 is a diagram illustrating an overall configuration of a vehicular cooperation platform as an embodiment of mounting a user interface device on a vehicle.

As illustrated in FIG. 1, a vehicular cooperation PF 1 according to the embodiment includes a gateway ECU 2, a GPS antenna 3, a USB interface 5, a switch 6, a USB memory device 7, a wireless adaptor 8, and a smartphone 9 (exemplifying a mobile control device). The gateway ECU 2 is connected to an onboard network system. The GPS antenna 3 is connected to the gateway ECU 2. The USB memory device 7 is connected to the USB interface 5. The smartphone 9 is communicable with the wireless adaptor 8.

The gateway ECU 2 together with the onboard network system is placed inside the vehicle. The GPS antenna 3 is placed on a dashboard in a vehicle compartment, for example. The USB interface 5 and the switch 6 are placed near a driver's seat of the vehicle so as to be easily accessible from a driver.

The GPS antenna 3 receives a radio wave (GPS signal) from an artificial satellite for GPS (Global Positioning System) to detect the vehicle's current position.

The USB memory device 7 represents a portable storage device that connects with a computer to read or write data using the USB (Universal Serial Bus). A USB connector is directly attached to the body of the USB memory device 7.

The wireless adaptor 8 is connected to a computer incompatible with Bluetooth (registered trademark) and enables wireless communication with Bluetooth-compatible device. A USB connector is directly attached to the body of the wireless adaptor 8 to connect to the computer.

The USB interface 5 exemplifies a hardware interface that connects the computer to an external device. The USB interface 5 according to the embodiment includes one USB connector connected to the gateway ECU 2.

<Configuration of the Gateway ECU>

The gateway ECU 2 belongs to several ECUs (Electronic Control Units) included in the onboard network system and enables data communication between an external device and the other ECUs. The onboard network system according to the embodiment allows several ECUs to perform data communication according to a protocol referred to as CAN (Control Area Network). One or more ECUs transmit detection data (hereinafter referred to as "vehicle information") indicating vehicle states to the gateway ECU 2.

Figure 2:
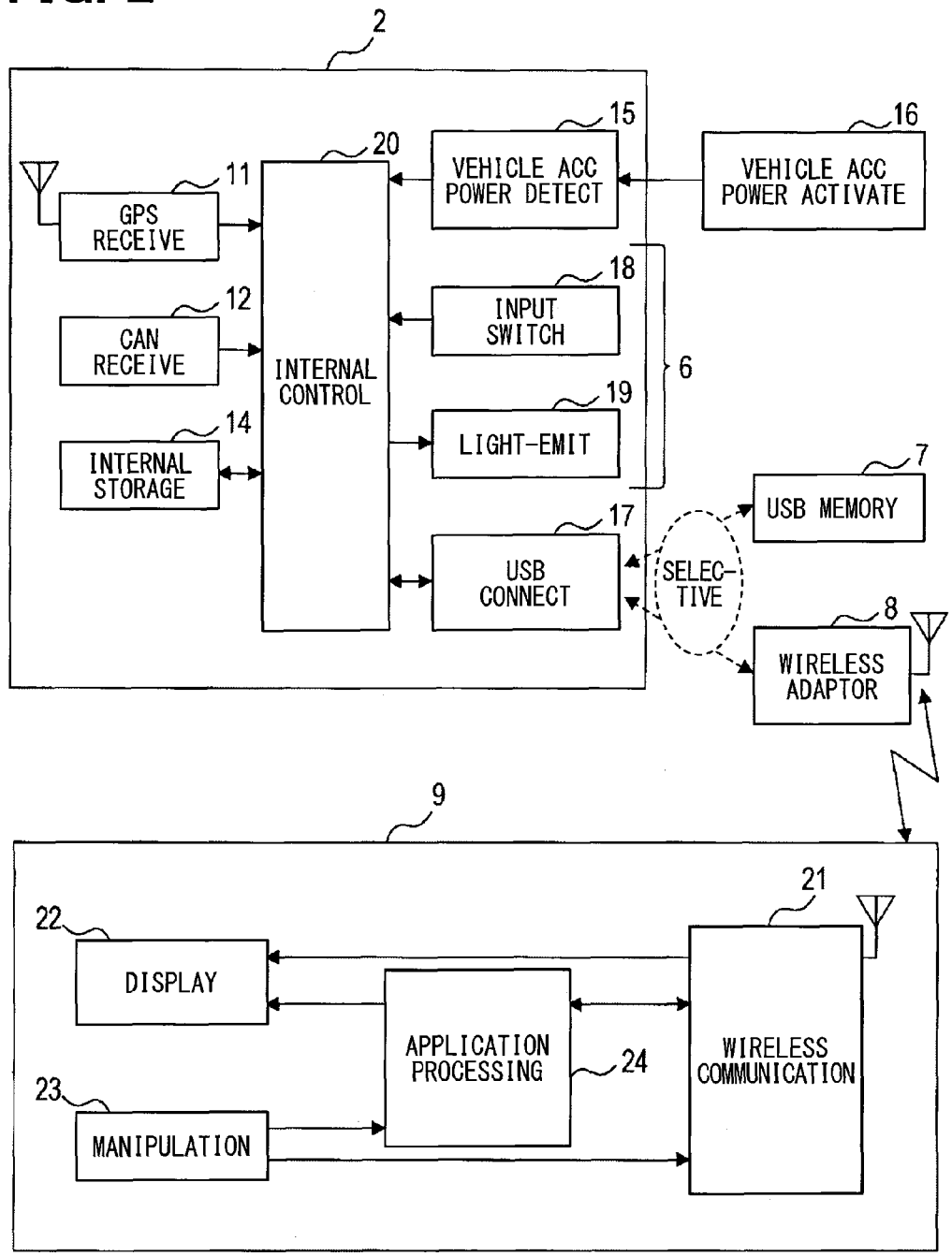
FIG. 2 is a block diagram illustrating a configuration of a gateway ECU and a smartphone.

Specifically, as illustrated in FIG. 2, the gateway ECU 2 includes a GPS receiver 11, a CAN receiver 12, an internal storage device 14, a vehicle accessory power supply detection device 15, a switch 6, a USB connection device 17, an internal control device 20.

The CAN receiver 12 is connected to a communication line included in the onboard network system. The CAN receiver 12 receives data transmitted from other ECUs and supplies reception data to the internal control device 20. The reception data includes vehicle information that includes travel data and state data. The travel data contains a vehicle speed, an acceleration, an accelerator pedal stroke, a steering angle, a brake operation signal, a shift operation signal, and an engine speed. The state data contains a water temperature.

The GPS receiver 11 receives a GPS signal via the GPS antenna 3 and supplies the GPS signal as the vehicle information to the internal control device 20. The GPS receiver 11 and the CAN receiver 12 provide examples of a vehicle information input portion (means).

The vehicle accessory power supply detection device 15 is connected to a vehicle accessory power supply activation device 16. The vehicle accessory power supply activation device 16 detects whether or not an accessory power supply is turned on. The vehicle accessory power supply activation device 16 applies a voltage of 12 V to a power supply line when a vehicle's ignition switch is rotated to an accessory position, for example. The gateway ECU 2 is connected to the power supply line.

The USB connection device 17 detects whether or not an external device is connected to the USB interface 5. When an external device is connected to the USB interface 5, the USB connection device 17 intermediates data communication between the external device (the USB memory device 7 or the wireless adaptor 8 according to the embodiment) and the internal control device 20. When the wireless adaptor 8 is connected to the USB interface 5, the USB connection device 17 further intermediates data communication between the smartphone 9 as the external device and the internal control device 20 via the wireless adaptor 8.

The internal storage device 14 includes flash memory or a hard disk, for example. According to an instruction from the internal control device 20, the internal storage device 14 stores vehicle information supplied from the CAN receiver 12 or the GPS receiver 11.

The switch 6 is integrated with a mechanical input switch 18 and a light-emitter 19. The input switch 18 inputs user's press manipulation to the internal control device 20. The light-emitter 19 is provided for a top end surface of the input switch 18. Namely, the switch 6 is provided as a light-emitter-attached input switch. For example, the light-emitter 19 uses an LED (Light Emitting Diode) that lights when a voltage is applied in accordance with an instruction from the internal control device 20.

The internal control device 20 includes, as its main component, a known microcomputer including a CPU, RAM, ROM, and I/O. The CPU performs various control processes to be described later using the RAM as a work area based on a program stored in the ROM, for example.

<Smartphone Configuration>

The smartphone 9 may include a known device and has a conversation function, a mail function, a browser function, and an application function and accepts user's input manipulation using a touch panel. Available application functions include a realtime display function and a driving application function. The realtime display function displays vehicle information received from the gateway ECU 2. The driving application function selects a vehicle's course line on a car racing circuit or coaches braking points, for example.

The smartphone 9 is compatible with Bluetooth and includes a wireless communication portion 21, a display 22, a manipulation portion 23, and an application processing portion 24. The wireless communication portion 21 enables wireless communication with the gateway ECU 2. The display 22 displays various types of information such as vehicle information. The manipulation portion 23 accepts user's input manipulation. The application processing portion 24 performs a process to implement an application function selected by a user using the manipulation portion 23.

The application processing portion 24 may include, as its main component, a known microcomputer. Suppose that the user uses the manipulation portion 23 to select the realtime display function or the driving application function. In such case, the application processing portion 24 controls the wireless communication portion 21 to perform a wireless connection process to establish communication with the gateway ECU 2. When completing the wireless connection process, the application processing portion 24 requests the gateway ECU 2 to transmit the vehicle information.

<Control Processes on the Gateway ECU>

The following describes control processes performed by the internal control device 20 in the gateway ECU 2. The control processes include a first control process and a second control process. The first control process allows the USB memory device 7 to store the vehicle information (e.g., travel data and GPS signal). The second control process transmits vehicle information to the smartphone 9.

A function implemented by the first control process is referred to as a game machine cooperation function. For example, the game machine cooperation function uses the user's travel data (stored in the USB memory device 7) for a racing game running on a home video game machine to virtually reproduce the user's travel in the game. A function implemented by the second control process is referred to as a smartphone cooperation function. Specifically, the smartphone cooperation function is exemplified as the realtime function or the driving application function described above.

Figure 3:
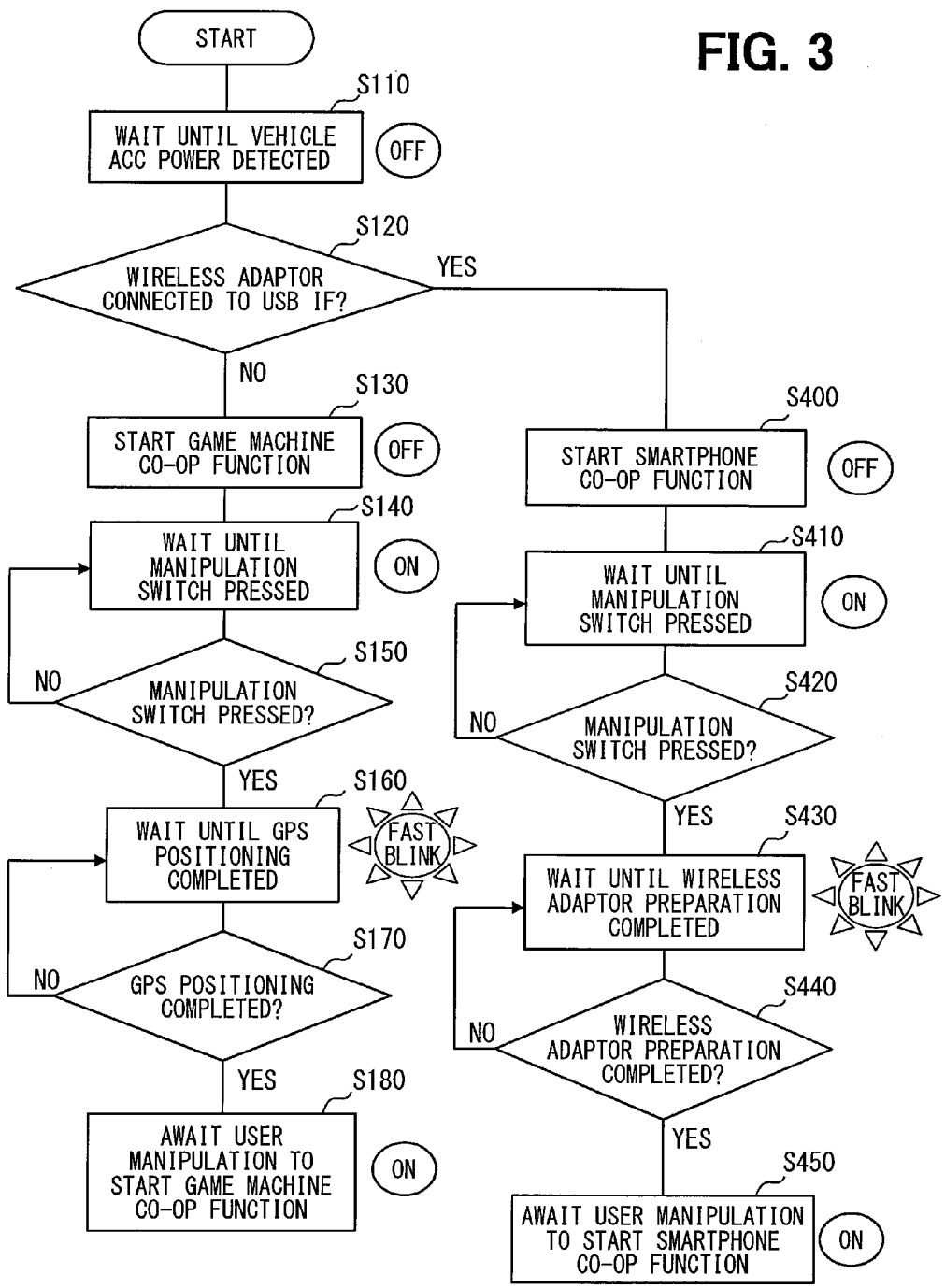
FIG. 3 is a first flowchart illustrating a process performed by the internal control device.

At S110 as illustrated in FIG. 3, the internal control device 20 waits until detecting that the vehicle accessory power supply detection device 15 detects activation of the accessory power supply. When activation of the accessory power supply is detected, the internal control device 20 proceeds to S120 while maintaining the light-emitter 19 in an off state. The off state of the light-emitter 19 represents that the accessory power supply is turned off or a service preparation is in progress in the background after the accessory power supply is turned on.

At S120, when the service preparation is completed in the background, the internal control device 20 determines based on a detection result from the USB connection device 17 whether or not the USB interface 5 connects with the wireless adaptor 8. If the determination is affirmed, the internal control device 20 proceeds to S400. If the determination is negated, the internal control device 20 proceeds to S130. Namely, the internal control device 20 proceeds to S400 when the USB interface 5 connects with the wireless adaptor 8. The internal control device 20 proceeds to S130 when the USB interface 5 connects with the USB memory device 7 or no external device.

At S130, the internal control device 20 starts the control process (first control process) corresponding to the game machine cooperation function. After starting the control process according to the embodiment, the internal control device 20 changes the light-emitter 19 from the off state to the on state and proceeds to S140.

At S140, the internal control device 20 waits until the input switch 18 accepts the user's press manipulation. At S130, the off state of the light-emitter 19 indicates that the service preparation is in progress in the background after the first control process starts. The on state of the same indicates that the internal control device 20 waits until the user presses the input switch 18.

At S150, the internal control device 20 determines whether or not the user presses the input switch 18. If the determination is affirmed, the internal control device 20 changes the light-emitter 19 from the on state to a blink state and proceeds to S160. If the determination is negated, the internal control device 20 returns to S140.

At S160, the internal control device 20 configures the blink state so that the light-emitter 19 blinks fast. In addition, the internal control device 20 performs a task that allows the GPS receiver 11 to start a reception process to receive a GPS signal (GPS positioning). The internal control device 20 then waits until the start process is complete. The fast blink state of the light-emitter 19 indicates that the service preparation is in progress in the background after the GPS positioning starts.

At S170, the internal control device 20 determines whether or not the GPS positioning start process is complete. If the determination is affirmed, the internal control device 20 changes the light-emitter 19 from the blink state to the on state and proceeds to S180. If the determination is negated, the internal control device 20 returns to S160.

At S180, the internal control device 20 waits until the input switch 18 again accepts the user's press manipulation in order to start the control process (first control process) corresponding to the game machine cooperation function. The internal control device 20 then proceeds to S190 (see FIG. 4). The on state of the light-emitter 19 at S170 indicates that the internal control device 20 waits until the user presses the input switch 18.

Figure 4:
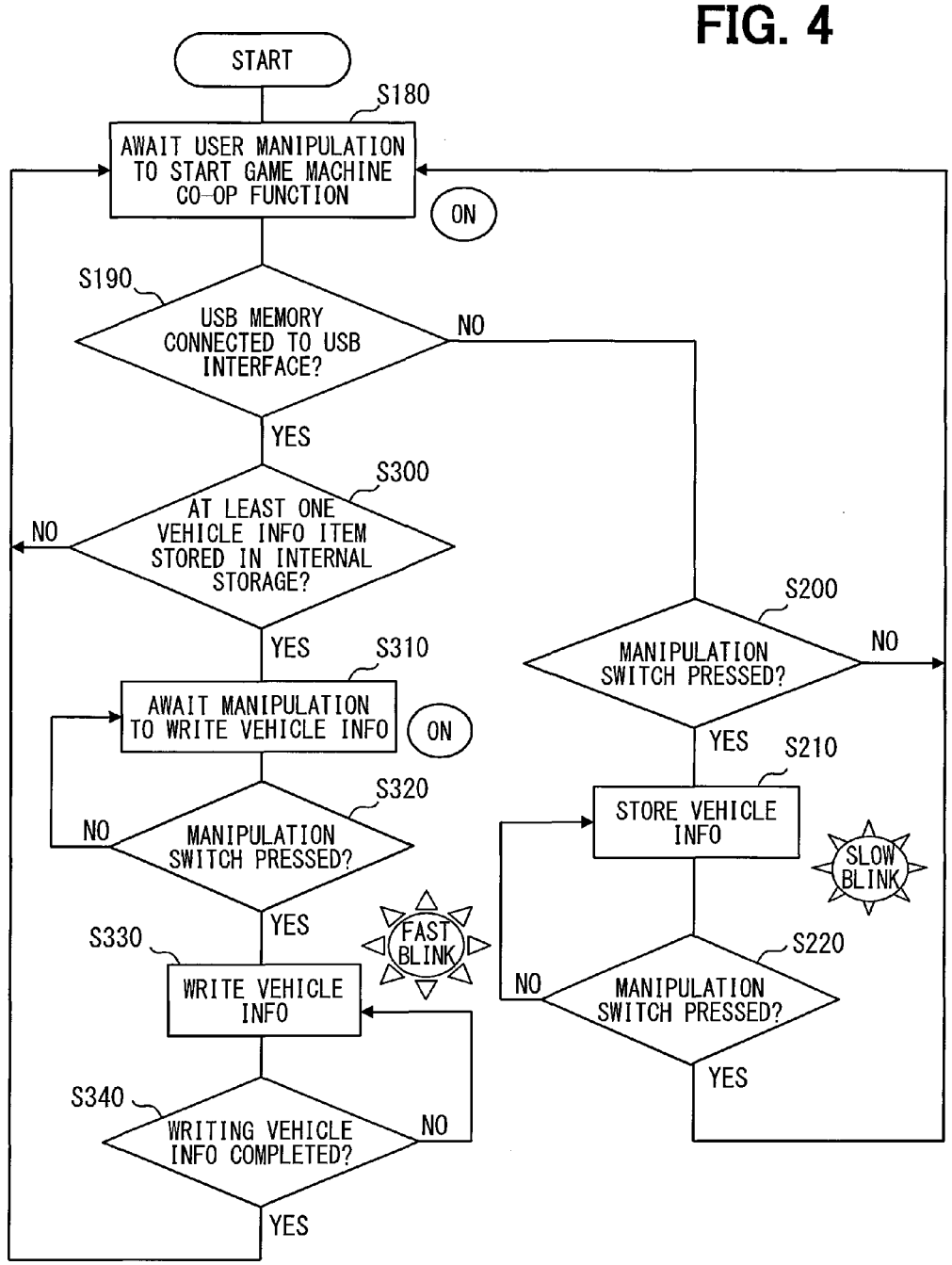
FIG. 4 is a second flowchart illustrating a process performed by the internal control device.

At S190 as illustrated in FIG. 4, the internal control device 20 determines based on a detection result from the USB connection device 17 whether or not the USB interface 5 connects with the USB memory device 7. If the determination is affirmed, the internal control device 20 proceeds to S300. If the determination is negated, the internal control device 20 proceeds to S200. Namely, the internal control device 20 proceeds to S300 when the USB interface 5 connects with the USB memory device 7. The internal control device 20 proceeds to S200 when the USB interface 5 connects with no external device.

At S200, the internal control device 20 determines whether or not the user presses the input switch 18. If the determination is affirmed, the internal control device 20 changes the light-emitter 19 from the off state to the blink state and proceeds to S210. If the determination is negated, the internal control device 20 returns to S180.

At S210, the internal control device 20 configures the blink state so that the light-emitter 19 blinks slowly. In addition, the internal control device 20 performs a task (first task) that allows the internal storage device 14 to store the vehicle information inputted from the GPS receiver 11 and the CAN receiver 12. Namely, the light-emitter 19, when blinking slowly, indicates that the vehicle information is being recorded.

At S220, the internal control device 20 determines whether or not the user again presses the input switch 18. When the determination is affirmed, the internal control device 20 changes the light-emitter 19 from the blink state to the on state and then returns to S180. When the determination is negated, the internal control device 20 returns to S210. After starting the first task at S210, the internal control device 20 may skip S220 and return to S180.

The game cooperation function needs to incorporate the vehicle information into the USB memory device 7. For this purpose, the internal storage device 14 needs to store a certain amount of vehicle information. The user does not initially use the USB memory device 7 to use the game cooperation function and waits until the internal storage device 14 stores the vehicle information. The user needs to connect the USB memory device 7 after a certain amount of vehicle information is stored.

The user interrupts this storage task (first task in the claims) when determining that the internal storage device 14 has stored a certain amount of vehicle information. The user's press manipulation is assumed to be a trigger to transition to a task (second task in the claims) of writing the vehicle information to the USB memory device 7. According to the example, the press manipulation is assumed to be a trigger while the light-emitter 19 blinks slowly at S210.

The internal control device 20 proceeds to S300 when the USB interface 5 connects with the USB memory device 7 at S190. At S300, the internal control device 20 determines whether or not the internal storage device 14 stores at least one piece of vehicle information. If the determination is affirmed, the internal control device 20 proceeds to S310. If the determination is negated, the internal control device 20 returns to S180.

At S310, the internal control device 20 waits until the input switch 18 again accepts the user's press manipulation to start writing the vehicle information. The internal control device 20 maintains the light-emitter 19 in the on state at S170.

At S320, the internal control device 20 determines whether or not the user presses the input switch 18. If the determination is affirmed, the internal control device 20 changes the light-emitter 19 from the on state to the blink state and proceeds to S330. If the determination is negated, the internal control device 20 returns to S310.

At S330, the internal control device 20 configures the blink state so that the light-emitter 19 blinks fast. In addition, the internal control device 20 performs the task (second task) to transfer the vehicle information stored in the internal storage device 14 to the USB memory device 7. Namely, the light-emitter 19, when blinking fast, indicates that the vehicle information is being written out (written into) to the USB memory device 7.

At S340, the internal control device 20 determines whether or not the second task is complete, in other words, whether or not all the vehicle information stored in the internal storage device 14 is written to the USB memory device 7. If the determination is affirmed, the internal control device 20 changes the light-emitter 19 from the blink state to the on state and returns to S180. If the determination is negated, the internal control device 20 returns to S330. When completing the write to the USB memory device 7, the internal control device 20 deletes the vehicle information stored in the internal storage device 14.

The internal control device 20 proceeds to S400 when the USB interface 5 connects with the wireless adaptor 8 at S120. At S400, the internal control device 20 starts the control process (second control process) corresponding to the smartphone cooperation function. After the control process starts according to the embodiment, the internal control device 20 changes the light-emitter 19 from the off state to the on state and proceeds to S410.

At S410, the internal control device 20 waits until the input switch 18 accepts the user's press manipulation. Namely, the light-emitter 19 in the off state at S400 indicates that the service preparation is in progress in the background after the second control process starts. The light-emitter 19 in the on state indicates that the internal control device 20 waits until the user presses the input switch 18.

At S420, the internal control device 20 determines whether or not the user presses the input switch 18. If the determination is affirmed, the internal control device 20 changes the light-emitter 19 from the on state to the blink state and proceeds to S430. If the determination is negated, the internal control device 20 returns to S410.

At S430, the internal control device 20 configures the blink state so that the light-emitter 19 blinks fast. In addition, the internal control device 20 performs a task that starts an operation preparation process for the wireless adaptor 8. The internal control device 20 then waits until the operation preparation process is complete. Namely, the light-emitter 19, when blinking fast, indicates that the service preparation is in progress in the background after the operation preparation process for the wireless adaptor 8 starts.

At S440, the internal control device 20 determines whether or not the operation preparation process for the wireless adaptor 8 is complete. If the determination is affirmed, the internal control device 20 changes the light-emitter 19 from the blink state to the on state and proceeds to S450. If the determination is negated, the internal control device 20 returns to S430.

At S450, the internal control device 20 waits until the input switch 18 again accepts the user's press manipulation to start the control process (second control process) corresponding to the smartphone cooperation function. The internal control device 20 proceeds to S460 (see FIG. 5). The light-emitter 19 in the on state at S440 indicates that the internal control device 20 waits until the user presses the input switch 18.

Figure 5:
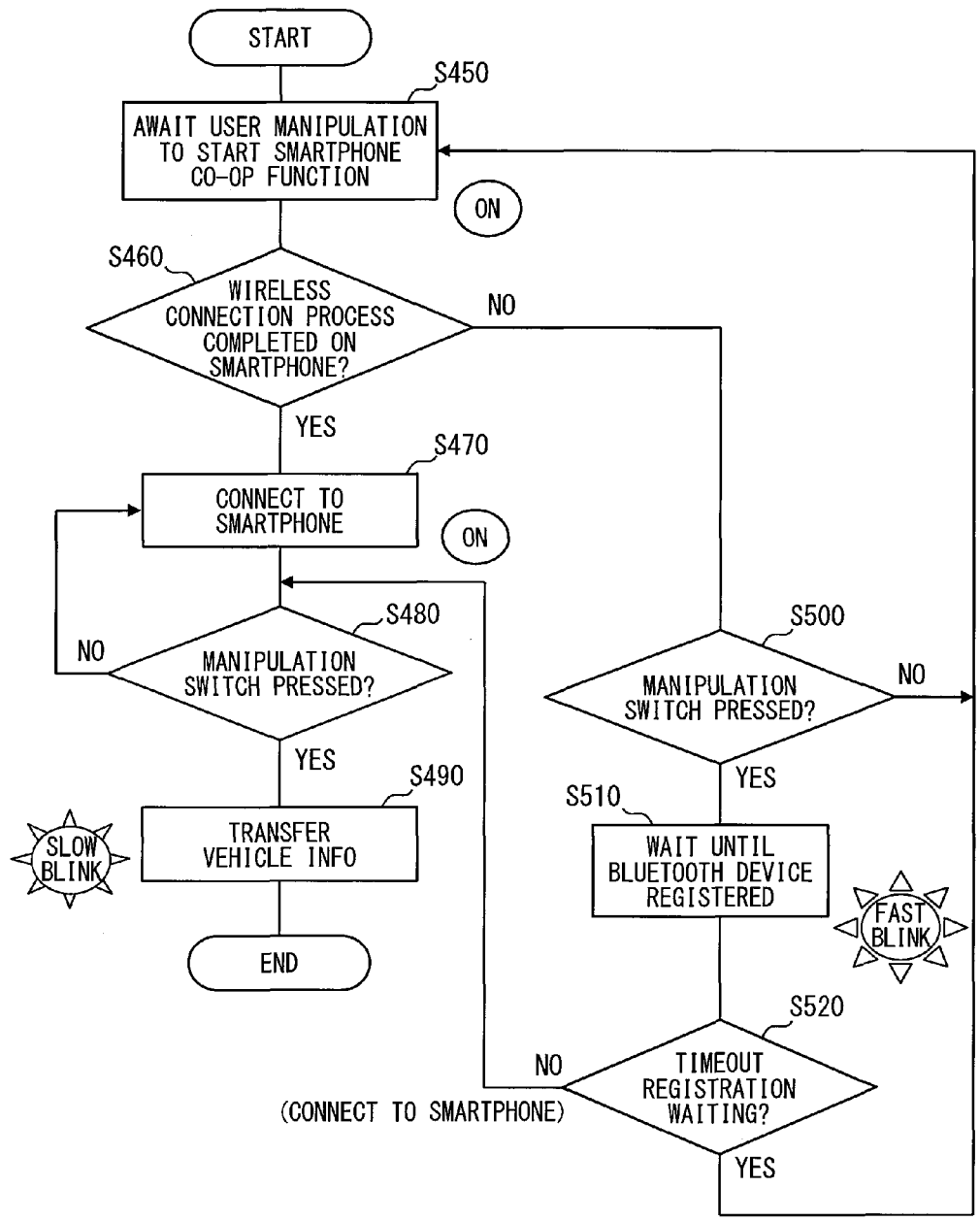
FIG. 5 is a third flowchart illustrating a process performed by the internal control device.

At S460 as illustrated in FIG. 5, the internal control device 20 determines whether or not the smartphone 9 receives a communication establishment request via the wireless adaptor 8. The communication establishment request is transmitted to establish communication when the above-mentioned wireless connection process is performed. If the determination is affirmed, the internal control device 20 proceeds to S470. If the determination is negated, the internal control device 20 proceeds to S500.

At S470, the internal control device 20 transmits an acknowledgement signal corresponding to the communication establishment request via the wireless adaptor 8 to the smartphone 9 to wirelessly connect to the smartphone 9. The internal control device 20 proceeds to S480.

At S500, the internal control device 20 waits until the input switch 18 accepts the user's press manipulation to start a Bluetooth device registration process that establishes communication with the smartphone 9 autonomously from the wireless adaptor 8. The internal control device 20 maintains the on state of the light-emitter 19 at S400. The internal control device 20 determines whether or not the user presses the input switch 18. If the determination is affirmed, the internal control device 20 changes the light-emitter 19 from the on state to the blink state and proceeds to S510. If the determination is negated, the internal control device 20 returns to S450.

At S510, the internal control device 20 configures the blink state so that the light-emitter 19 blinks fast. In addition, the internal control device transmits a communication establishment request to establish communication with the smartphone 9 via the wireless adapter 8. The internal control device 20 performs a task that waits (i.e., wait for Bluetooth device registration) until receiving an acknowledgement signal in response to the communication establishment request from the smartphone 9. Namely, the light-emitter 19, when blinking fast, indicates that the internal control device 20 awaits an acknowledgement signal from the smartphone 9 (wait for Bluetooth device registration).

At S520, the internal control device 20 determines whether or not the wait time exceeds a timeout time predetermined for the wait for Bluetooth device registration. If the determination is affirmed, the internal control device 20 changes the light-emitter 19 from the blink state to the on state and returns to S450. If the determination is negated, namely, if an acknowledgement signal is received from the smartphone 9 within the timeout time, the internal control device 20 wirelessly connects to the smartphone 9, changes the light-emitter 19 from the blink state to the on state, and proceeds to S480.

At S480, the internal control device 20 waits until the input switch 18 again accepts the user's press manipulation to start transferring the vehicle information. The internal control device 20 maintains the on state of the light-emitter 19. The internal control device 20 determines whether or not the user presses the input switch 18. If the determination is negated, the internal control device 20 receives the above-mentioned transmission request from the smartphone 9 via the wireless adaptor 8, changes the light-emitter 19 from the on state to the blink state, and proceeds to S490. If the determination is negated, the internal control device 20 still waits.

At S490, the internal control device 20 configures the blink state so that the light-emitter 19 blinks slowly. In addition, the internal control device 20 performs a task (third task) that transmits (transfers) the vehicle information inputted from the GPS receiver 11 and the CAN receiver 12 to the smartphone 9 via the wireless adaptor 8 without storing the vehicle information in the internal storage device 14. Namely, the light-emitter 19, when blinking slowly, indicates that the vehicle information is being transferred to the smartphone 9. The above-mentioned second control process terminates when the wireless adaptor 8 is removed from the USB interface 5, for example.

<State Transition of the Light-Emitter>

Figure 6:
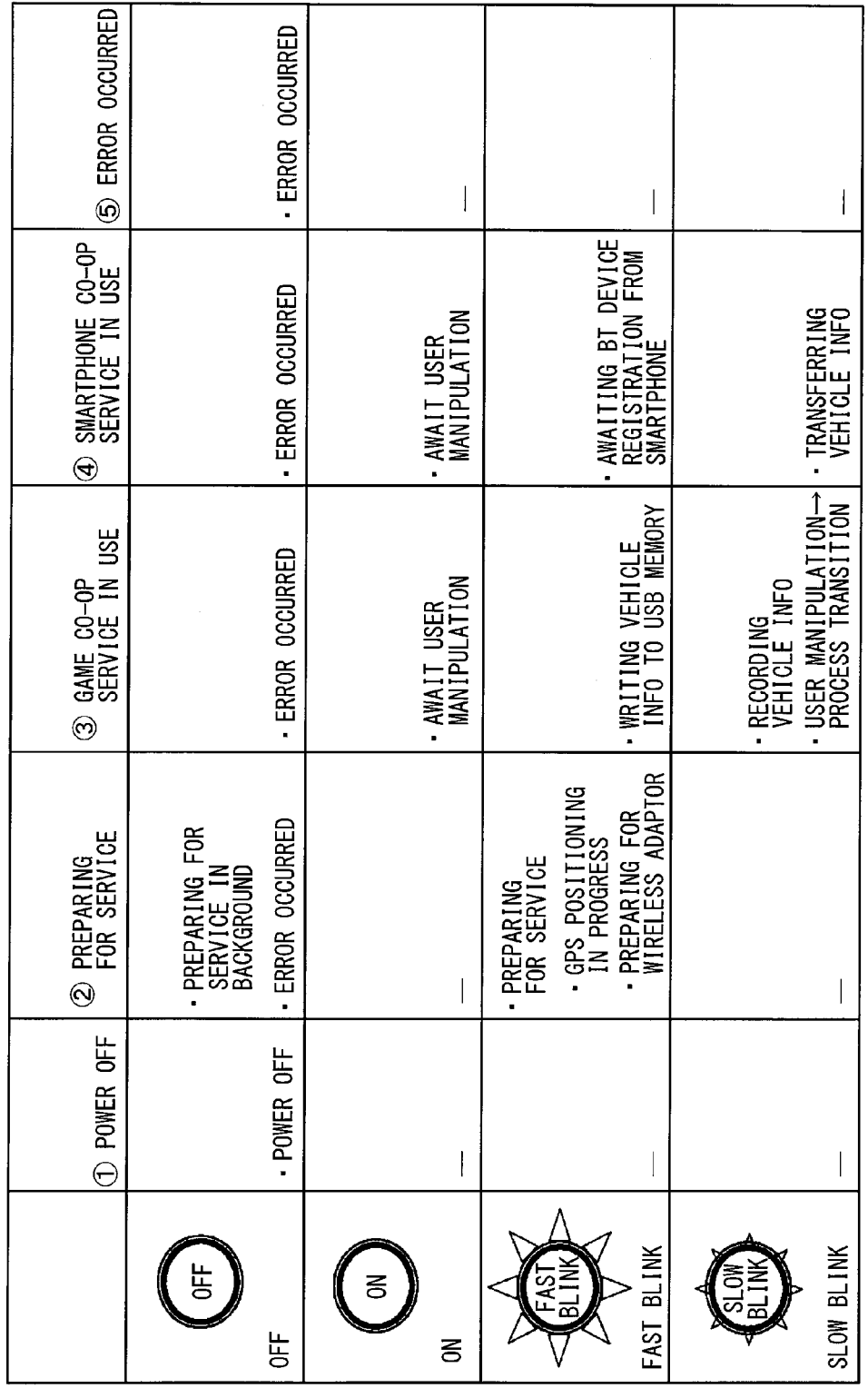
FIG. 6 is a matrix chart illustrating state transition of a light-emitter.

FIG. 6 illustrates states of the light-emitter 19 that transitions according as the internal control device 20 of the gateway ECU 2 performs a control process.

The light-emitter 19 turns off when the accessory power supply is off.

Suppose that the game machine cooperation function or the smartphone cooperation function (service) is being prepared for use. In this case, the light-emitter 19 turns off when the service preparation is in progress in the background after the accessory power supply turns on or when an error occurs. The light-emitter 19, when blinking fast, indicates that the service preparation is in progress after the GPS positioning starts or after the operation preparation process for the wireless adaptor 8 starts.

An error occurrence turns off the light-emitter 19 while the game machine cooperation function (service) is being used. The on state of the light-emitter 19 indicates that the internal control device 20 waits until the user presses the input switch 18. The fast blink state of the light-emitter 19 indicates that the internal control device 20 is writing the vehicle information out (in) to the USB memory device 7. The slow blink state of the light-emitter 19 indicates that the internal control device 20 is recording the vehicle information.

An error occurrence turns off the light-emitter 19 while the smartphone cooperation function (service) is being used. The on state of the light-emitter 19 indicates that the internal control device 20 waits until the user presses the input switch 18. The slow blink state of the light-emitter 19 indicates that the internal control device 20 is transferring the vehicle information to the smartphone 9. The fast blink state of the light-emitter 19 indicates that the internal control device 20 awaits an acknowledgement signal from the smartphone 9 (wait for Bluetooth device registration).

When the accessory power supply is turned on, the off state of the light-emitter 19 indicates an error occurrence except the service preparation in progress in the background after the accessory power supply is turned on.

<Effects>

In the gateway ECU 2 according to the embodiment as described above, the internal control device 20 performs the first or second control process to implement one of functions that corresponds to the type of an external device connected to the USB interface 5 and determination whether or not to an external device is connected to the USB interface 5. More specifically, the internal control device 20 performs, from among multiple tasks constituting the control process, a task corresponding to the timing of pressing the switch 6. The internal control device 20 blinks the light-emitter 19 of the switch 6 at a predetermined speed while the task is in execution. The internal control device 20 turns on the light-emitter 19 to terminate the task and prompt the user to input a next press manipulation.

The user just needs to select an external device connected to the gateway ECU 2 or the necessity of connecting the external device. The gateway ECU 2 automatically performs a control process corresponding to the selected function. This can eliminate the need for the user to select functions using a touch panel. Further, the user just needs to press the activated switch 6 in order to change a task (item) executed in the control process (function) to the next task (item). This can also eliminate the need for the user to specify items using a touch panel.

Allowing the user to simply input the state of the light-emitter 19 is considered to shorten the time needed for the input manipulation rather than using the information on a displayed image. The user just needs to press the switch 6 when the light-emitter 19 turns on. The user just needs to wait while the light-emitter 19 blinks. The user can easily identify a request from the internal control device 20 according to the state of the light-emitter 19.

According to the embodiment, the vehicular cooperation PF 1 includes the gateway ECU 2 as well as the external device. With a simple configuration, the gateway ECU 2 can easily accept a function (and an item) requested by the user and intuitively transmit a request from the internal control device 20 to the user.

In the gateway ECU 2, the internal control device 20 variably controls the blink speed of the light-emitter 19 according to the type of task in execution. A combination of (i) an external device to connect to the gateway ECU 2 or the necessity of connecting the external device and (ii) the lighting-up speed of the light-emitter 19 can intuitively notify the user what task of the active control process is in execution or, in other words, to what item in what function the task in execution corresponds.

When no external device is connected to the USB interface 5, the internal control device 20 in the gateway ECU 2 performs the first task that allows the internal storage device 14 to store the vehicle information inputted via the GPS receiver 11 and the CAN receiver 12. When the USB memory device 7 is connected to the USB interface 5, the internal control device 20 performs the second task that transfers the vehicle information stored in the internal storage device 14 to the USB memory device 7.

Connecting the USB memory device 7 to the gateway ECU 2 transfers the vehicle information that is stored in the internal storage device 14 before the connection occurs. This enables to effectively store more vehicle information in the USB memory device 7.

When the smartphone 9 is wirelessly connected to the USB interface 5, the internal control device 20 in the gateway ECU 2 performs the third task that transfers vehicle information inputted via the GPS receiver 11 and the CAN receiver 12 without storing the vehicle information in the internal storage device 14.

The smartphone 9 provides realtime control using the vehicle information received from the gateway ECU 2. The gateway ECU 2 need not record the vehicle information, making it possible to save a memory area in the internal storage device 14.

Other Embodiments

While there has been illustrated the embodiment of the present invention, the invention is not limited to the above embodiment but may be otherwise variously embodied within the spirit and scope of the invention.

For example, in the above-mentioned embodiment, while the preparation for the use of the game machine cooperation function or the smartphone cooperation function (service) is in progress, the internal control device 20 turns off the light-emitter 19 during the service preparation in progress in the background after the accessory power supply is turned on. Alternatively, the light-emitter 19 may blink at a low speed.

In the above-mentioned embodiment, while the internal control device 20 is using the game machine cooperation function or the smartphone cooperation function (service), the blink speed of the light-emitter 19 varies depending on what task is in execution. Alternatively, the blink speed of the light-emitter 19 may be constant regardless of what task is in execution, for example.

In the above-mentioned embodiment, the gateway ECU 2 constitutes the vehicular cooperation PF 1 together with an external device. However, the invention is not limited to embodiments for vehicles but can be appropriately embodied as a user interface device that constitutes all types of cooperation platforms together with an external device.

The present disclosure can provide user interface devices according to various embodiments.

For example, a user interface device according to an example of the present disclosure constitutes a cooperation platform together with an external device. Specifically, the user interface device includes a light-emitter-attached input switch, a hardware interface, and an internal control device. The light-emitter-attached input switch includes an input switch for a user to input press manipulation and is provided with a light-emitter. The hardware interface is connectable to various types of external devices. The internal control device performs several control processes corresponding to predetermined functions.

With this simple configuration, the internal control device performs a single control process to implement one of the functions that corresponds to at least one of: the type of an external device connected to the hardware interface or whether or not to an external device is connected to the hardware interface. In more detail, the internal control device executes a task corresponding to the timing to input press manipulation using the input switch with the light-emitter. The internal control device blinks the light-emitter at a predetermined speed while the task is in execution. The internal control device steadily lights the light-emitter when terminating the task and prompting the user to input a next press manipulation.

The user just needs to select an external device connected to the user interface device or the necessity of connecting the external device. The user interface device automatically performs a control process corresponding to the function associated with the selection. This can eliminate the need for the user to select functions using a touch panel.

Further, the user just needs to press the input switch with the activated light-emitter in order to change a task (item) executed in the control process (function) to the next task (item). This can also eliminate the need for the user to specify items using a touch panel.

Allowing the user to simply input the switch state is considered to shorten the time needed for the input manipulation rather than using the information on a displayed image. Because the user just needs to press the switch when the switch turns on and the user just needs to wait while the switch blinks, the user can easily identify a request from the internal control device according to the state of the switch.

Therefore, according to the present disclosure, with a simple configuration, the user interface device constituting the cooperation platform together with the external device can easily accept a function (and an item) requested by the user and intuitively transmit a request from the internal control device to the user.

In the present disclosure, the internal control device may variably control the blink speed of the light-emitter according to the type of task in execution.

According to this configuration, a combination of (i) an external device to connect to the user interface device or the necessity of connecting the external device and (ii) the lighting-up speed of the light-emitter can intuitively notify the user what task in the active control process is in execution or, in other words, to what item in what function the task in execution corresponds.

In the present disclosure, a vehicle information input portion for inputting detection data indicating a vehicle state and an internal storage device capable of storing the detection data may be provided.

In this case, when no external device is connected to the hardware interface, the internal control device according to the present disclosure may perform a first task that stores in the internal storage device the detection data inputted via the vehicle information input portion. When a mobile storage device as the above-mentioned external device is connected to the hardware interface, the internal control device may perform a second task that transfers the detection data stored in the internal storage device to the mobile storage device.

In this configuration, when the connection to the mobile storage device is established, the detection data that was recorded in the internal storage device before the connection is transferred. This enables to effectively store more detection data in the mobile storage device.

In more detail, for example, the internal control device may set the blink speed of the light-emitter at a low speed while the first task is in execution. The internal control device may set the blink speed of the light-emitter at a high speed while the second task is in execution. Further, when the mobile storage device is connected to the hardware interface, the internal control device may turn on the light-emitter before executing the second task.

When a mobile control device as the external device is wirelessly connected to the hardware interface, the internal control device according to the present disclosure may perform a third task that transfers the detection data inputted via the vehicle information input portion without storing the detection data in the internal storage device.

According to this configuration, the mobile control device provides realtime control (e.g., displaying the vehicle information on a display device of the mobile control device) using the detection data received from the user interface device. The user interface device need not record the detection data, making it possible to save a memory area in the internal storage device.

While there have been illustrated the embodiments and configurations according to the present disclosure, embodiments and configurations according to the disclosure are not limited to the above-mentioned embodiments and configurations. The scope of the embodiments and configurations according to the disclosure also includes embodiments and configurations resulting from appropriately combining technical elements disclosed in different embodiments and configurations.

What is claimed is:

1. A user interface device comprising:
   a particular single light-emitter-attached input switch that includes a single input switch for a user to input press manipulation and a light-emitter attached to the single input switch;
   a hardware interface that is connectable to different types of external devices; and
   an internal control device that includes a processor and that performs a single control process to implement one of predetermined functions that corresponds to at least one of
   (i) a type of an external device connected to the hardware interface or
   (ii) whether an external device is connected to the hardware interface, wherein the internal control device
      (i) executes, from among a plurality of tasks constituting the single control process, a task that corresponds to timing of inputting the press manipulation using the single input switch of the particular single light-emitter-attached input switch,
      (ii) blinks the light-emitter of the particular single light-emitter-attached input switch at a predetermined speed while the task is in execution,
      (iii) steadily lights the light-emitter of the particular single light-emitter-attached input switch when terminating the task and prompting the user to input a next press manipulation for starting execution of a next task of the plurality of tasks constituting the single control process,
      (iv) executes the next task in response to the next press manipulation to the single input switch of the particular single light-emitter-attached input switch, and
      (v) blinks the light-emitter of the particular single light-emitter-attached input switch at the predetermined speed while the next task is in execution, wherein
   the hardware interface is a USB (Universal Serial Bus) interface,
   the USB interface is configured to be connectable to a USB memory device as the external device and a wireless adaptor, and
   the internal control device is configured to transfer data to the USB memory device or a mobile control device as the external device through the wireless adaptor, when the USB memory device or the mobile control device is connected to the USB interface.

2. The user interface device according to claim 1, wherein the internal control device variably controls a blink speed of the light-emitter according to a type of the task that is in execution.

3. The user interface device according to claim 1, further comprising:
   a vehicle information receiver that inputs detection data indicating a vehicle state; and
   an internal storage device including memory and capable of storing the detection data,
   wherein:
   when none of the USB memory device and the mobile control device is connected to the USB interface, the internal control device performs a first task of storing, in the internal storage device, the detection data inputted via the vehicle information receiver;
   when the USB memory device is connected to the USB interface, the internal control device performs a second task that transfers the detection data stored in the internal storage device to the USB memory device; and
   when the mobile control device is wirelessly connected to the USB interface through the wireless adaptor, the internal control device performs a third task of transferring the detection data inputted via the vehicle information receiver to the mobile control device without storing the detection data in the internal storage device.

4. The user interface device according to claim 3, wherein:
   the internal control device performs a process that sets the blink speed of the light-emitter at a low speed when the task in execution corresponds to the first task and sets the blink speed of the light-emitter at a high speed when the task in execution corresponds to the second task; and
   in response to the user's press manipulation on condition that the task in execution corresponds to the first task and the blink speed of the light-emitter is set at the low speed, the internal control device performs an exception process that interrupts the first task and starts the second task.

5. The user interface device according to claim 3, wherein:
   when an errors occurs and either the USB memory device or the mobile control device is connected to the USB interface, the internal control device controls the light-emitter in an off state; and
   when the internal control device is awaiting press manipulation of the single input switch and either the USB memory device or the mobile control device is connected to the USB interface, the internal control device controls steadily lights the light-emitter.

6. The user interface device according to claim 5, wherein when the internal control service is preparing for service prior to connection of the USB memory device or the mobile control device to the USB interface, the internal control device blinks the light-emitter at the predetermined speed.

7. The user interface device according to claim 1, wherein:
   in accordance with at least one of (i) the type of the external device connected to the hardware interface or (ii) whether or not the external device is connected to the hardware interface, the internal control device automatically performs the single control process selectively from among a plurality of control processes, which respectively correspond to the predetermined functions different from each other.

8. The user interface device according to claim 1, wherein:
upon completion of service preparation, the internal control device determines whether or not a particular type of the external device is connected to the hardware interface;
in response to determining that the particular type of the external device is connected to the hardware interface, the internal control device automatically performs a first control process as the single control process selectively from among a plurality of control processes, which respectively correspond to the predetermined functions different from each other; and
in response to determining that the particular type of the external device is not connected to the hardware interface, the internal control device automatically performs, as the single control process, a second control process different from the first control process selectively from among the plurality of control processes.

9. A user interface device comprising:
a light-emitter-attached input switch that includes an input switch for a user to input press manipulation and a light-emitter attached to the input switch;
a hardware interface that is connectable to different types of external devices; and
an internal control device that automatically performs a single control process selectively from among a plurality of control processes corresponding to predetermined different functions, in accordance with at least one of (i) a type of the external device connected to the hardware interface or (ii) whether or not the external device is connected to the hardware interface,
wherein the internal control device
 (i) executes, from among a plurality of tasks constituting the single control process, a task that corresponds to timing of inputting the press manipulation using the light-emitter-attached input switch,
 (ii) blinks the light-emitter at a predetermined speed while the task is in execution, and
 (iii) steadily lights the light-emitter when terminating the task and prompting the user to input a next press manipulation, wherein
the hardware interface is a USB (Universal Serial Bus) interface,
the USB interface is configured to be connectable to a USB memory device as the external device and a wireless adaptor, and
the internal control device is configured to transfer data to the USB memory device or a mobile control device as the external device through the wireless adaptor, when the USB memory device or the mobile control device is connected to the USB interface.

10. The user interface device according to claim 9, wherein:
upon completion of service preparation, the internal control device determines whether or not a particular type of the external device is connected to the hardware interface;
in response to determining that the particular type of the external device is connected to the hardware interface, the internal control device automatically performs a first control process as the single control process selectively from among a plurality of control processes, which respectively correspond to the predetermined functions different from each other; and
in response to determining that the particular type of the external device is not connected to the hardware interface, the internal control device automatically performs, as the single control process, a second control process different from the first control process selectively from among the plurality of control processes.

11. The user interface device according to claim 9, further comprising:
a vehicle information receiver that inputs detection data indicating a vehicle state; and
an internal storage device including memory and capable of storing the detection data,
wherein:
when none of the USB memory device and the mobile control device is connected to the USB interface, the internal control device performs a first task of storing, in the internal storage device, the detection data inputted via the vehicle information received;
when the USB memory device is connected to the USB interface, the internal control device performs a second task that transfers the detection data stored in the internal storage device to the USB memory device: and
when the mobile control device is wirelessly connected to the USB interface through the wireless adaptor, the internal control device performs a third task of transferring the detection data inputted via the vehicle information receiver to the mobile control device without storing the detection data in the internal storage device.

* * * * *